No. 772,981. PATENTED OCT. 25, 1904.
J. H. VOLKMANN.
CANDY PULLING MACHINE.
APPLICATION FILED MAR. 19, 1904.
NO MODEL. 2 SHEETS—SHEET 1.
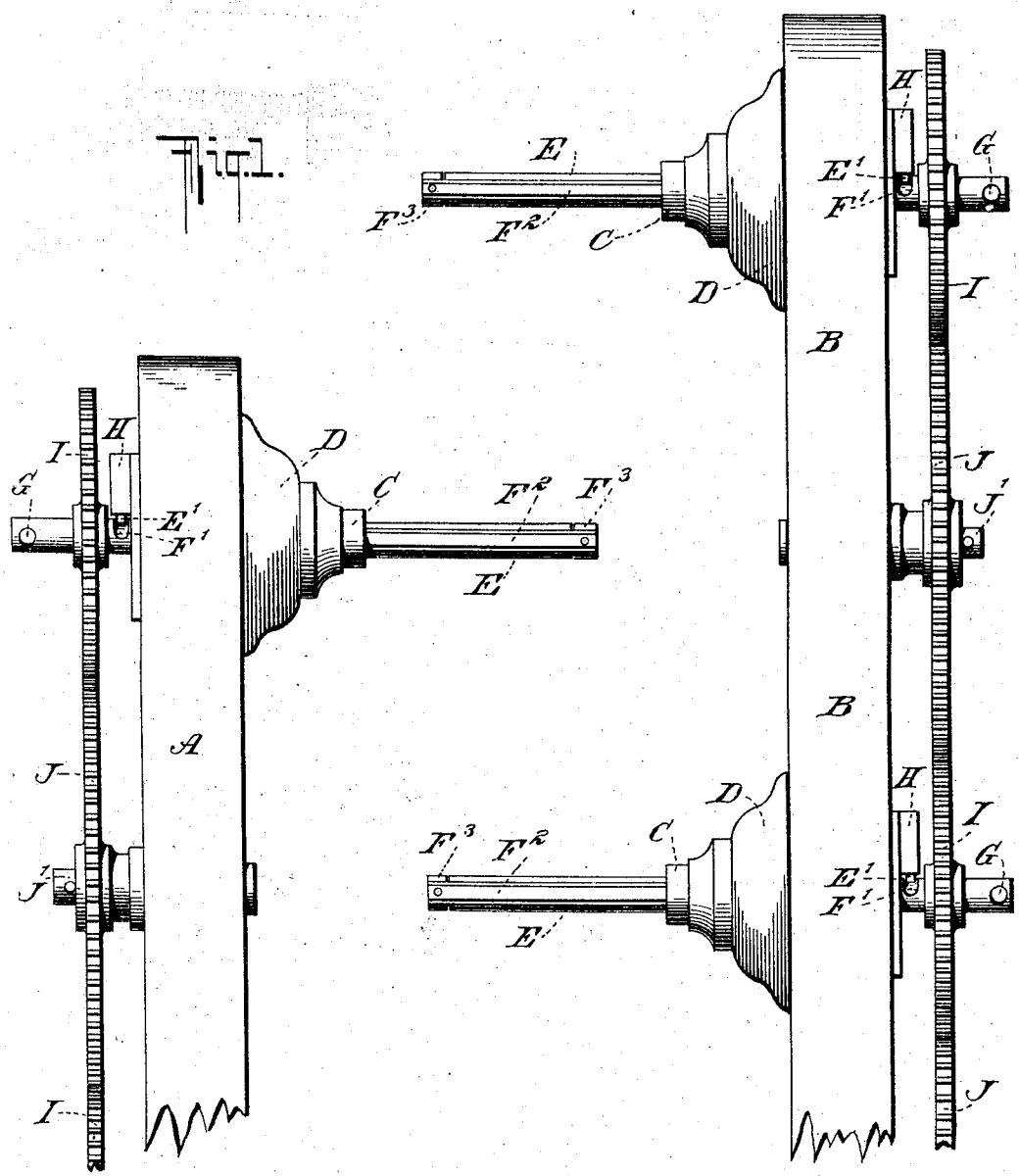
WITNESSES:
INVENTOR
John H. Volkmann
BY
ATTORNEYS No. 772,981. PATENTED OCT. 25, 1904.
J. H. VOLKMANN.
CANDY PULLING MACHINE.
APPLICATION FILED MAR. 19, 1904.
NO MODEL. 2 SHEETS—SHEET 2.
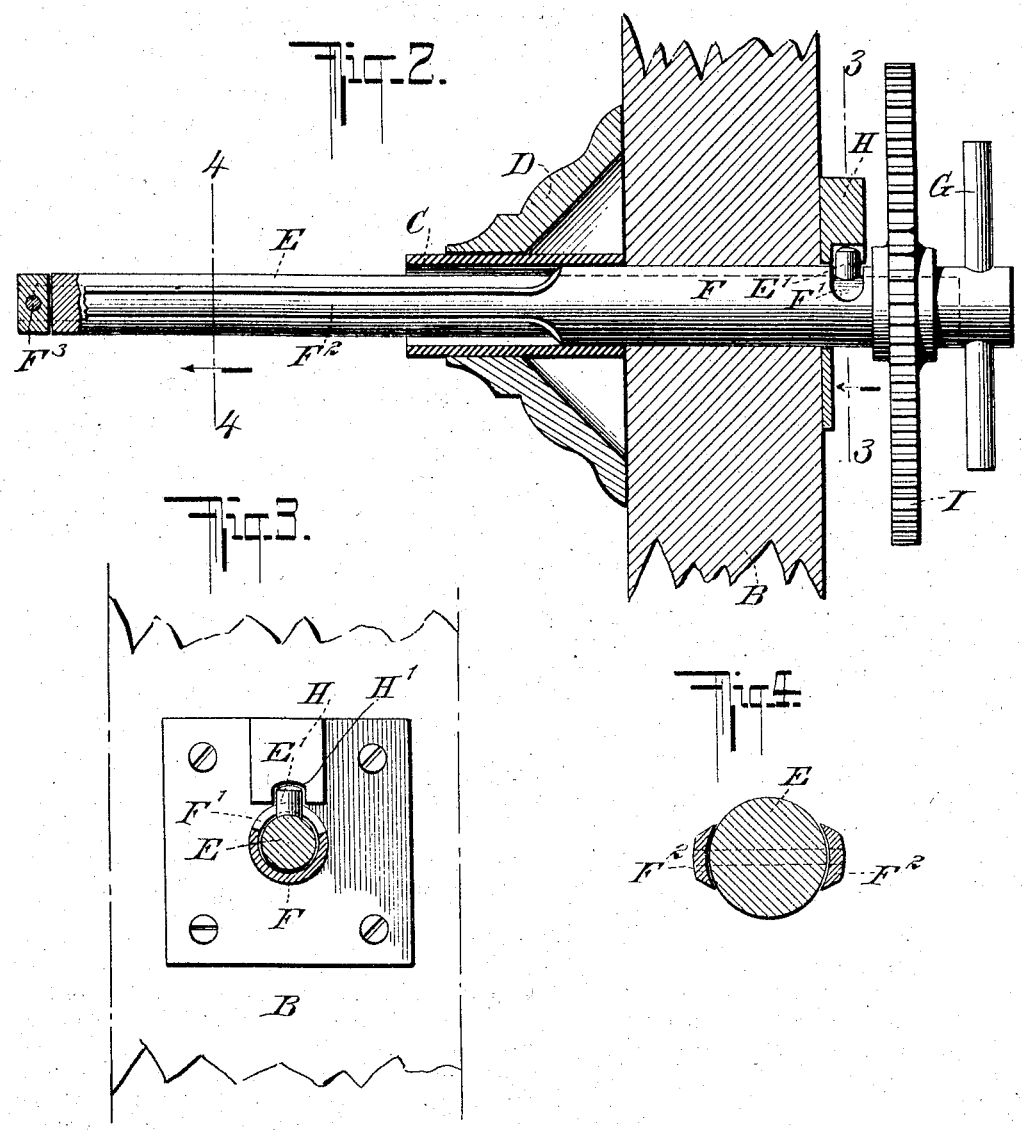
WITNESSES:
INVENTOR
John H. Volkmann
BY
ATTORNEYS No. 772,981.

Patented October 25, 1904.

UNITED STATES PATENT OFFICE.

JOHN H. VOLKMANN, OF NEW YORK, N. Y.

CANDY-PULLING MACHINE.

SPECIFICATION forming part of Letters Patent No. 772,981, dated October 25, 1904.

Application filed March 19, 1904. Serial No. 198,903. (No model.)

*To all whom it may concern:*

Be it known that I, JOHN H. VOLKMANN, a subject of the Emperor of Germany, and a resident of the borough of Manhattan, city, county, and State of New York, have invented certain new and useful Improvements in Candy-Pulling Machines, of which the following is a specification.

My invention relates to candy-pulling machines, and has for its object to provide means for facilitating the taking of all the viscous mass or batch from the projections of the machine adapted to carry and stretch such mass. To this end I have constructed the said projections or carriers in a particular novel manner, as will appear in detail from the description following hereinafter. I have also provided in my improved machine guards of a novel character to prevent the candy batch from coming in contact with and adhering to any part but the carriers above referred to.

Reference is to be had to the accompanying drawings, in which—

Figure 1 is a side elevation of a portion of a machine embodying my improvements. Fig. 2 is an enlarged elevation of one of the carriers with parts in section; and Figs. 3 and 4 are sections on lines 3 3 and 4 4, respectively, of Fig. 2.

My present invention has no reference to the particular mechanism employed for imparting to the carriers or projections the motion by which the candy is stretched, and any suitable device may be employed for this purpose—as, for instance, those described in my application for a United States patent, filed December 3, 1903, Serial No. 183,557.

In Fig. 1 of the drawings I have illustrated two members A B, on which the carriers or projections are mounted, and one of these members, A, is reciprocated vertically while the other member, B, is reciprocated horizontally by any suitable mechanism. Each of the members carries one or more projections, which extend toward the other member and are adapted to act as supports for the candy batch and to stretch the batch as the projections of one member move away from those of the other. Each projection consists of at least two members movable relatively to each other and each forming a portion of the surface adapted to receive the candy batch. Thus by moving the sections of the projections relatively to each other the candy batch may be loosened and separated from the said projections.

In detail the construction shown is as follows: Each of the members A B has a sleeve C for each of the projections or carriers and is also preferably provided with a guard D surrounding such sleeve, the diameter of such guard increasing toward the member to which it is attached, so that the candy will slip off said guards away from the members carrying such guards. Thus the candy is prevented from coming in contact with the members A B and will even be prevented from staying on the guard D. The members A B are perforated in alinement with the sleeves C for the reception of the carriers or projections. Each of the carriers comprises a rod E and a sleeve F surrounding said rod and capable of a limited rotation relatively thereto. In order to allow of such movement, yet prevent the sleeve and rod from moving lengthwise of each other, I may provide a pin E' on the rod, which pin projects through a segmental slot F' of the sleeve. The sleeve is apertured at its carrying portion, forming two or more longitudinal bars F², which partly cover the surface of the rod E. The edges of these bars F², which are adjacent to the rod E, are preferable sharpened, so that they will act as cutter edges. The free ends of the arms F² are connected in any suitable manner, preferably by means of a disk F³. Each rod E, with the sleeve F belonging thereto, may be moved bodily into and out of the sleeve C by a sliding movement, and to facilitate this manipulation I may apply a handle G to the sleeve F, as shown in Fig. 2.

In order to rotate one of the sections of the carrier relatively to the other, I provide the following mechanism: From the member A or B is projected a bracket H, provided with a slot H', adapted to receive the pin E' when the carriers are pushed fully inward, as shown in Fig. 2. In this position, therefore, the rod E will be held against turning, and if the operator swings the handle G to one side or the other within the limits allowed by the slot F' the bars F² will turn on the rod E and their sharp edges will cut and sever from the said rod the candy adhering thereto. It has been found in machines of this character that the candy adheres to the metal very strongly, and considerable difficulty has been experienced in removing the candy from the carriers or pins. After the candy has been loosened by the rotation of the cutter-bars F² an outward pull on the handle G (which may be removable, if desired) will withdraw the rod E and sleeve F with the bars F² from the member A or B, so as to leave the candy perfectly free to be removed. It is not necessary that the rod E and sleeve F be removed entirely, as it is sufficient to withdraw them into the sleeve C.

In some cases it might be of advantage to rotate all of the sleeves F and cutter-bars F² simultaneously. This may be obtained in any suitable manner—as, for instance, by mounting gear-wheels I upon the sleeves F—said wheels to mesh with intermediate gear-wheels J, which are mounted on studs J', carried by the members A and B. When the carriers are in their normal position, the gear-wheels I will be in mesh with the gear-wheels J, yet the outward sliding movement of the carriers will not be interfered with. As a rule, the gear-wheels I J may be dispensed with, each of the carriers being operated independently by means of its handle G or equivalent device.

I desire it to be understood that various modifications may be made without departing from the nature of my invention. While I have described the sections of the carrying members as mounted to turn one relatively to the other, I desire it to be well understood that I do not restrict myself to this particular movement, as substantially the same advantages might be obtained with movements of a different kind. Furthermore, while I have shown a construction in which one section of the carrying member has a limited rotary movement relatively to the other section, it is not necessary that such turning movement should be restricted in its extent.

I claim as my invention—

1. In a machine of the character described, the combination with a plurality of members and projections extending therefrom and adapted to carry and stretch a viscous substance, of guards surrounding said projections adjacent to said members and flaring toward the members.

2. In a machine of the character described, the combination with opposing members and projections extending from said members toward each other and adapted to carry and stretch a viscous substance, of guards interposed between the said members and the active portions of the carriers, said guards flaring toward said members.

3. In a machine of the character described, the combination with a plurality of members and projections mounted thereon and adapted to carry and stretch a viscous substance, of guards interposed between the active portions of said projections and the members carrying such projections, said guards flaring toward said members.

4. In a machine of the character described, a carrying member for a viscous substance, said member being composed of a plurality of sections movable relatively to each other and each forming a part of the exposed or carrying surface of said member, so that any viscous substance adhering to the member will be loosened by the relative movement of said sections.

5. In a machine of the character described, a carrying member for the viscous substance, said member consisting of a plurality of sections mounted to turn one relatively to the other and each forming a portion of the exposed or carrying surface of such member.

6. In a machine of the character described, a carrying member for the viscous substance, consisting of a plurality of sections movable relatively to each other, one of said sections constituting a cutter or scraper to sever the viscous substance from the carrying member.

7. In a machine of the character described, a carrying member provided with a cutter-section movable to sever the viscous substance from said carrying member.

8. In a machine of the character described, a carrying member comprising a rod and a sleeve surrounding the same and mounted to turn thereon, said sleeve being provided with bars extending over a portion of the rod.

9. In a machine of the character described, the combination with a supporting member, a projection extending therefrom and adapted to carry a viscous substance, said projection comprising a rod and a sleeve mounted to turn on said rod and provided with means for severing the viscous substance from the rod, and means for holding the rod against rotation relatively to the supporting member.

10. In a machine of the character described, the combination with a supporting member, of a sleeve having a sliding connection with said supporting member and also mounted to turn therein, a rod arranged within said sleeve and held to move therewith lengthwise, and a pin projected from the rod through a slot in the sleeve to a locking engagement with the supporting member, to prevent said rod from turning, the said sleeve being provided with means for severing the viscous substance from the rod.

11. In a machine of the character described, the combination with a supporting member, of a projection mounted to slide on said supporting member lengthwise of the axis of such projection, so as to withdraw the projection from engagement with the viscous substance carried thereby.

12. In a machine of the character described, the combination of a supporting member, a series of projections mounted on said supporting member and adapted to carry a viscous substance, each of said projections being provided with a movable section for loosening the viscous substance, and a connection between the movable sections of the said projections to operate them in unison.

In testimony whereof I have signed my name to this specification in the presence of two subscribing witnesses.

JOHN H. VOLKMANN.

Witnesses:
 JOHN LOTKA,
 OTTO V. SCHRENK.